United States Patent [19]

McDonald

[11] Patent Number: 4,829,698
[45] Date of Patent: May 16, 1989

[54] AERATED BAIT TANK

[76] Inventor: Robert C. McDonald, 649 Heathridge, Rock Hill, S.C. 29730

[21] Appl. No.: 214,162

[22] Filed: Jul. 5, 1988

[51] Int. Cl.⁴ .............................................. A01K 97/04
[52] U.S. Cl. ...................................... 43/57; 261/121.2
[58] Field of Search .................... 43/56, 57; 261/121.2

[56] References Cited

U.S. PATENT DOCUMENTS

| | | | |
|---|---|---|---|
| 2,194,037 | 3/1940 | Thuma | 261/121.2 |
| 2,587,834 | 3/1952 | Goode | 43/57 |
| 2,865,618 | 12/1958 | Abell | 261/121.2 |
| 2,970,401 | 2/1962 | Hays | 43/57 |
| 3,815,277 | 6/1974 | Murray | 43/57 |
| 3,822,498 | 7/1974 | Butler | 43/57 |
| 4,712,327 | 12/1987 | Ross et al. | 43/57 |

Primary Examiner—M. Jordan
Attorney, Agent, or Firm—Clifton Ted Hunt

[57] ABSTRACT

A portable bait tank for keeping fish and fish bait alive includes a circular storage chamber surrounding an aerator. The height of the aerator is less than the height of the storage chamber and the operating level of the water in the storage chamber is above the top of the aerator so water flows over the top of the aerator and is aerated as it cascades to the bottom of the aerator. A pump in the bottom of the aerator returns the aerated water to the storage chamber tangentially to induce and maintain a circular path for the flow of freshly aerated water in the storage chamber to provide maximum oxygen to the fish.

9 Claims, 2 Drawing Sheets

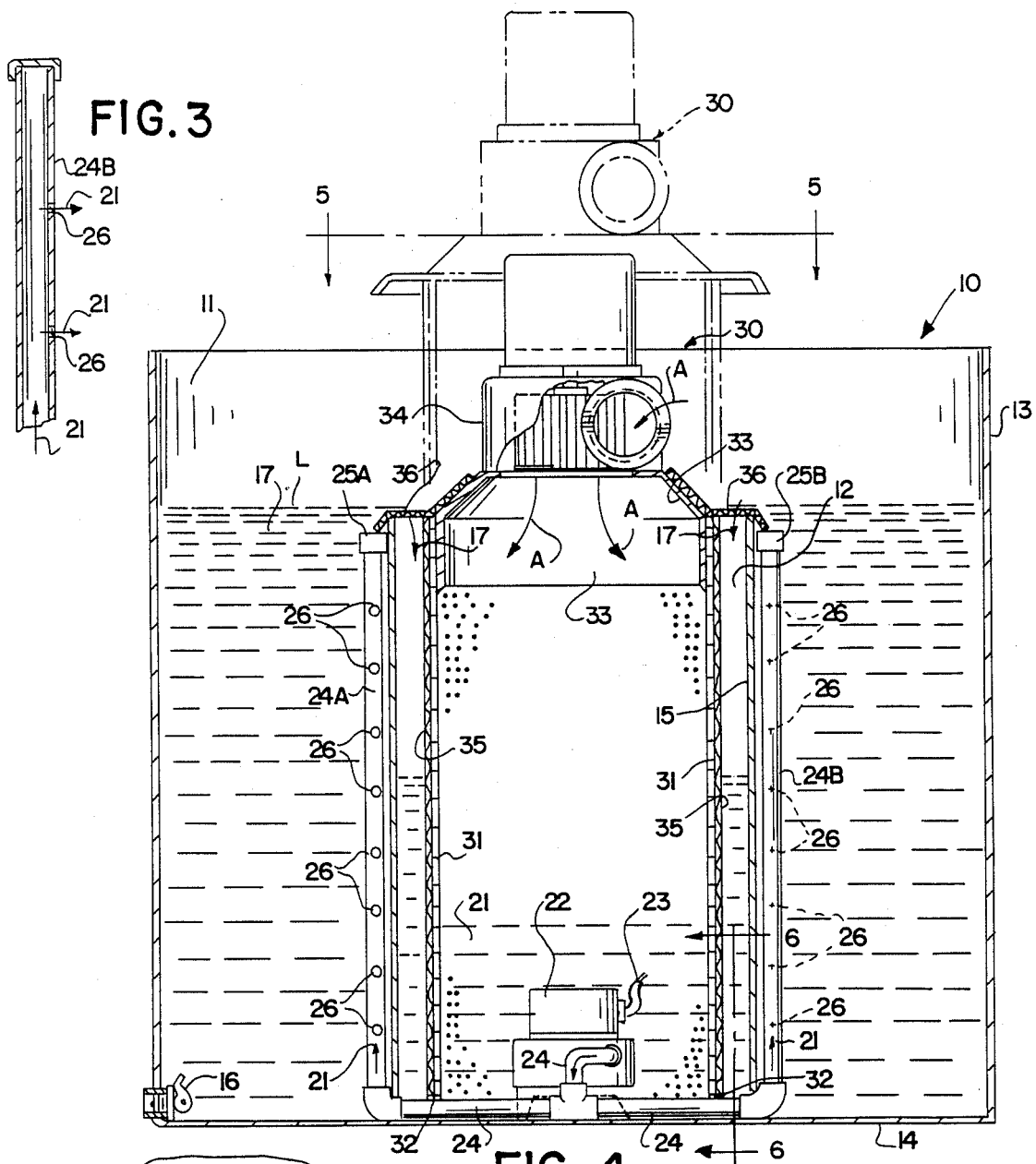
FIG. 3
FIG. 4
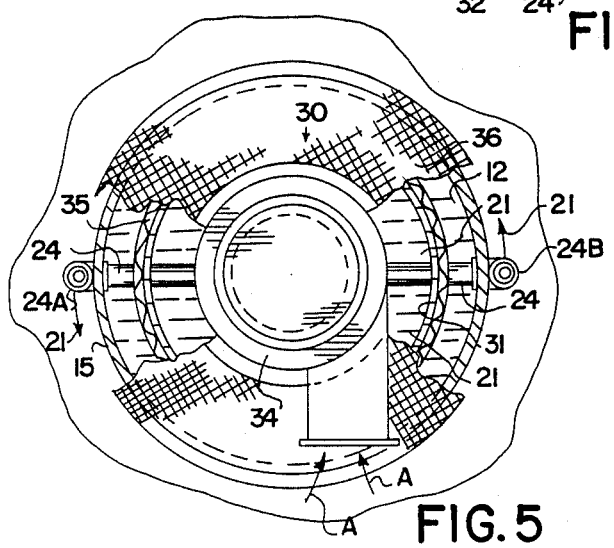
FIG. 5
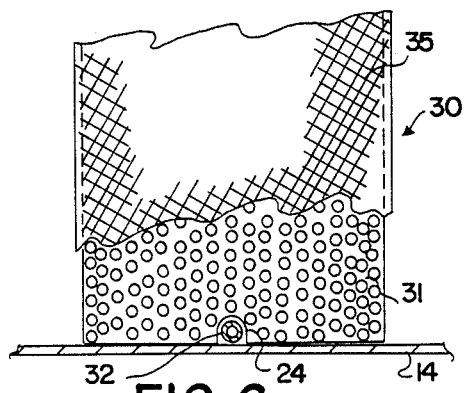
FIG. 6

4,829,698

AERATED BAIT TANK

FIELD OF THE INVENTION

This invention relates to the aeration and cooling of water in bait tanks for live fish.

BACKGROUND OF THE INVENTION

It is known to preserve live fish for bait by aerating the storage water in a tank. See, for example, U.S. Pat. No. 4,146,989 issued Apr. 3, 1979 to Vanus, et al. for BAIT TANK, U.S. Pat. No. 4,168,590 issued Sept. 25, 1979 to Beshoner for LIVE BAIT SUPPORT APPARATUS, and U.S. Pat. No. 4,677,785 issued July 7, 1987 to Lambourn for AERATED LIVE BAIT BUCKET.

Except for Beshoner, all of the aerated bait containers in the known prior art use an external source of air or water for aerating the storage water. Beshoner recirculate the water within the tank and aerates the water by spraying the return water on the surface of the storage water. The spraying of the water into the storage water creates undesirable turbulence and bubbles in the storage water. The bubbles sometimes accumulate on the gill rakers of the bait fish, causing asphyxiation.

Other patents for bait tanks show the cooling of water to preserve the fish, including U.S. Pat. No. 2,555,128 issued May 29, 1951 to Gutshall for FISHING CREEL COOLED BY EVAPORATION OF WATER, U.S. Pat. No. 2,631,402 issued Mar. 17, 1953 to Lastofka for REFRIGERATED BAIT BOX, U.S. Pat. No. 2,935,858 issued May 10, 1960 to Kingery for FISH BAIT CONTAINERS, and U.S. Pat. No. 4,697,380 issued Oct. 6, 1987 to Fenske for BAIT CONTAINER.

Other than Gutshall, the known prior art refrigerated bait tanks use ice as the refrigerant. Gutshall passively evaporates water from the outer surface of a water-permeable absorbent material maintained in close proximity to an inner water-impermeable heat conductive liner that holds the storage water.

SUMMARY OF THE INVENTION

The bait tank of this invention aerates the storage water by continuously cascading water from a storage chamber over the top of a shorter and centrally located aerator. The cascading water is aerated as it falls through about twelve (12) inches of air space in the aerator and into a shallow pool of freshly aerated water at the bottom of the aerator.

The freshly aerated water is quickly returned to the storage chamber by continuously pumping the freshly aerated water from the bottom of the aerator through vertically spaced outlets beneath the surface of the storage water. The vertically spaced outlets are arranged to direct the aerated water tangentially into the storage water to induce and maintain a constant circular current within the storage water to induce the fish to swim into and benefit from the freshly aerated water.

An alternate embodiment of the invention includes an evaporation unit which may be removably placed in the aerator in the path of the cascading water to cool the water as it aerates just before the freshly cooled and aerated water is returned to the storage chamber.

BRIEF DESCRIPTION OF THE DRAWINGS

FIG. 3 is a sectional view taken substantially along the line 3—3 in FIG. 1;

FIG. 4 is a vertical sectional view similar to FIG. 2 but showing an alternate embodiment of the invention wherein an evaporation unit is shown in solid lines, with parts broken away, in its operative position within the aerator, and in phantom lines above the aerator to illustrate that the evaporation unit is readily removable when desired;

FIG. 5 is a vertical sectional view, with parts broken away, taken substantially along the line 5—5 in FIG. 4; and FIG. 6 is a sectional view, with parts broken away, taken substantially along the line 6—6 in FIG. 4.

DETAILED DESCRIPTION OF THE INVENTION

Figure 1:
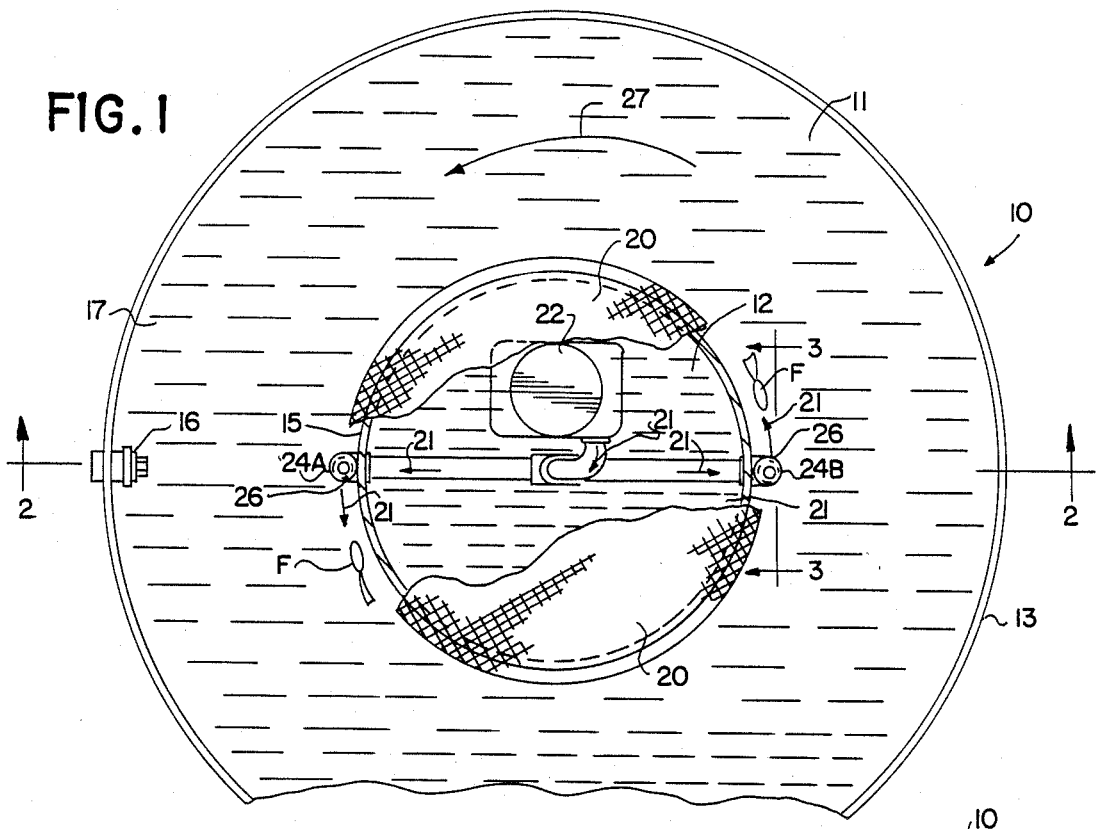
FIG. 1 is a top plan view, with parts broken away, of the bait tank.

Referring more specifically to the drawings, the numeral 10 broadly indicates a bait tank comprising a circular storage chamber 11 surrounding an aerator 12. The storage chamber 11 is defined by a circular outer wall 13 and a bottom wall 14 which also serves as the bottom of the aerator 12. The aerator is defined by an inner circular wall 15 extending in inwardly spaced concentric relation to the outer wall 13.

The walls 13, 14, and 15 may be formed from any desired material that is impervious to water. They have been formed, for example, from fiberglass in the illustrated embodiment of the invention, which has proven satisfactory. The dimensions of the walls are not critical but for the purpose of illustration, the outer wall 13 in the illustrated embodiment of the invention is twenty two (22) inches tall and twenty four (24) inches in diameter. The bottom wall 14 is also twenty four (24) inches in diameter, and the wall 15 of the aerator is seventeen (17) inches tall and ten and a half (10.5) inches in diameter.

A manually operable plug 16 is provided in the wall 13 near its juncture with the bottom wall 14. The plug 16 is normally closed when the bait tank 10 is in use but may be removed to release water from the storage chamber 11 when the bait tank is not in use.

Figure 2:
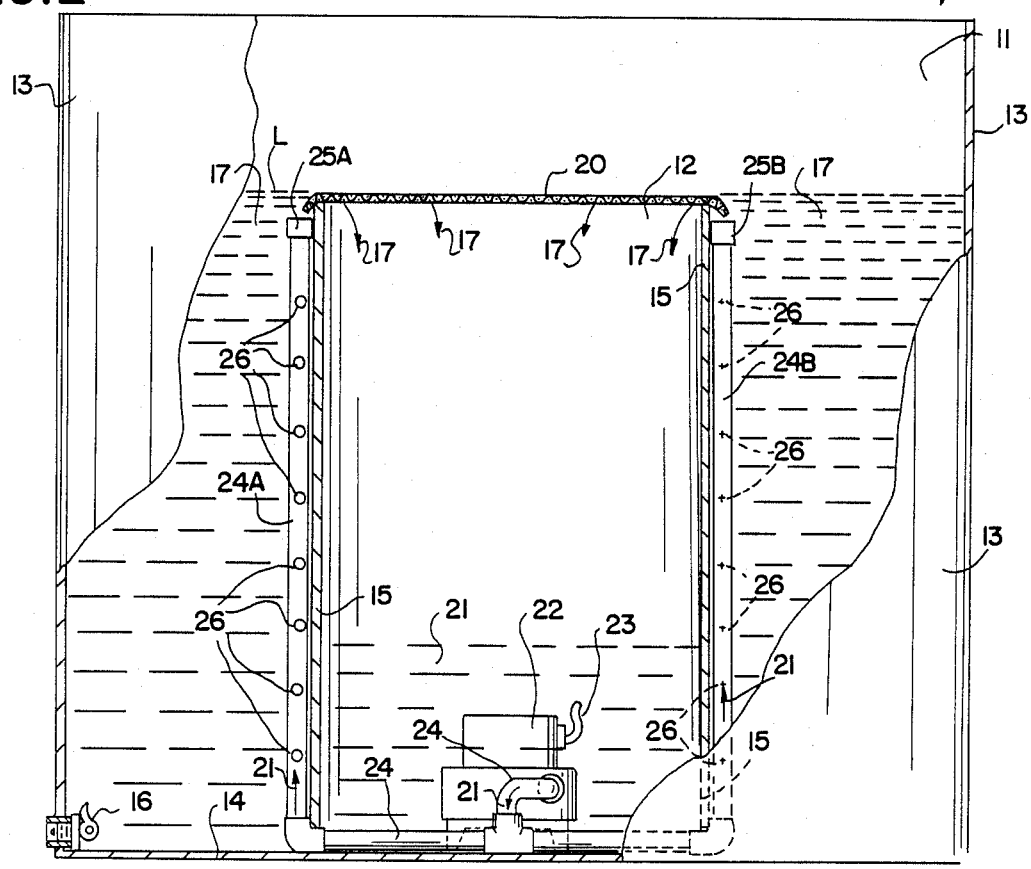
FIG. 2 is a sectional view taken substantially along the line 2—2 in FIG. 1.

In operation, the storage chamber 11 is filled with storage water 17 to the level L in FIGS. 2 and 4, which coincides with or is slightly higher than the height of the wall 15 so storage water 17 will continually be aerated during use as it cascades toward the bottom of the aerator 12. A screen 20 covers the open top of the aerator 12 to keep fish and foreign matter from falling into the aerator.

Aerated water 21 is continually returned to the storage chamber 11 from the bottom of the aerator by an electrically operable submersible pump 22 which is fastened to the bottom wall 14 within the aerator 12. Electric current to operate the pump may be provided by a battery, not shown, or by an external source of electrical energy through suitable wiring 23.

The pump 22 is operated to maintain about five (5) or six (6) inches of freshly aerated water 21 in the bottom of the aerator by pumping freshly aerated water 21 from the bottom of chamber 12 through a return line 24 extending from the pump and diametrically across the chamber 12.

The return line 24 extends through diametrically opposed lower end portions of the inner wall 15 to position one vertically extending end portion 24A along one portion of the wall. The other vertically extending end portion 24B of the return line 24 is positioned along a diametrically opposed portion of the wall 15. The vertical end portions 24A and 24B extend upwardly along the outer surface of inner wall 15 to their respective capped end portions 25A and 25B adjacent the top of the wall 15.

The vertically extending end portions 24A and 24B each have a plurality of vertically spaced outlets or ports 26 through which freshly aerated water 21 flows directly into the storage water 17 beneath the water surface L in FIGS. 2 and 4, thereby avoiding the creation of bubbles in the storage water.

In the illustrated embodiment, the inner wall 15 is seventeen (17) inches tall and there are eight (8) outlets 26 spaced about two (2) inches apart in each of the end portions 24A and 24B of the return line 24. The top and bottom outlets 26 are spaced about two (2) inches from the top and bottom of the wall 15 so that freshly aerated water 21 is constantly pumped into the storage water 17 at approximately two (2) inch intervals throughout the depth of the storage water 17.

It is well known that fish, indicated at F in FIG. 1, tend to swim against the current to absorb the oxygen released by the flowing water. For this reason, the outlets in the vertically extending end portions 24A and 44B are arranged in such a way as to induce and maintain a current in the storage water 17.

Toward this end, the outlets 26 in the vertically extending end portion 24A face toward the viewer in FIGS. 2 and 4 while the outlets 26 in the vertically extending end portion 24B face away from the viewer in those figures of the drawings. This arrangement causes the aerated water 21 (indicated by the arrows 21 in FIGS. 1, 2, 3, 4, and 5) to enter the storage water 17 at a tangent to the axis of the storage chamber 11, and to thereby induce and maintain a counter-clockwise current in the storage water 17, as indicated by the directional arrow 27 in FIG. 1. The location of the outlets 26 may be changed to correspondingly change the direction of the current in the storage chamber.

THE EVAPORATION UNIT

The evaporation unit of the alternate embodiment illustrated in FIGS. 4–6 is broadly indicated at 30. The evaporation unit 30 is an auxiliary piece of equipment which may by used with the bait tank 10 and its components that are illustrated in FIGS. 1–5. Like parts of the bait tank 10 bear like reference characters in FIGS. 4–6.

The evaporation unit 30 comprises a foraminated aluminum cylinder 31 eight (8) inches in diameter and seventeen (17) inches long in the illustrated embodiment. The cylinder 31 rests on the bottom wall 14 with opposed cut-outs 32 to receive the horizontal portions of the return pipe 24. The cylinder is coextensive in length with the inner wall 15 and, when assembled, extends in inwardly spaced relation to it, as shown in FIGS. 4 and 5.

The top of the cylinder 31 is closed by a cap 33 which supports an electrically powered fan 34 that blows atmospheric air into the cylinder 31 as indicated by the directional arrows A in FIG. 4. The outer surface of the cylinder 31 is covered by wire mesh 35 and a protective screen 36 extends between the cap 33 and wall 15 to keep fish and foreign matter from falling into the aeration chamber 12.

The storage water 17 cascading into the aeration chamber 12 flows downwardly on the wire mesh 35 while air from the fan 34 blows outwardly through the foraminated cylinder 31 and wire mesh 35 to hasten evaporation and dynamically cool the cascading water as it becomes aerated. Aeration of the water is enhanced by its passage through the wire mesh 35 of the evaporating unit. The cooled and aerated water 21 is returned to the storage water 17 by the pump 22 as described in connection with the embodiment of FIGS. 1–3.

There is thus provided a self contained bait tank which provides more aeration and cooling to the storage water than the previously known aerated and cooled bait tanks.

Specific embodiments of the invention have been illustrated and described to convey an understanding of the invention, but it is to be understood that many variations of the invention can be made without departing from the spirit of the invention. Accordingly, the foregoing description is not to be considered as limiting the rights of the inventor, except to the extent of the appended claims.

I claim:

1. A bait tank having a storage chamber defined by an outer wall and an inner wall for housing storage water and live bait, the improvement which comprises an aerator, said inner wall being shorter than the outer wall, and being a common wall between the storage chamber and aerator, said storage chamber having volumetrically sufficiently more water than the storage chamber will hold to gently cascade over the common wall into the aerator whereby the water is aerated, and means for returning aerated water to the storage chamber.

2. A bit tank according to claim 1 wherein the means for aerating the water in the aerator comprises an air space through which the water falls as it is delivered into the aerator, and means for preserving the air space during use of the bait tank.

3. A bait tank according to claim 2 wherein the means preserving the air space during use of the bait tank comprises a pump in the aerator, and a return line extending between the pump and the storage chamber, whereby water is constantly circulated between the aerator and the storage chamber to maintain the desired air space in the aerator during use of the bait trap.

4. A bait holder according to claim 1 wherein means are provided for creating a circular current in the storage chamber.

5. A bait holder according to claim 4 wherein said means comprises at least one vertically extending portion of a return line in said means for returning aerated water to the storage chamber, said vertically extending portion being positioned in the storage chamber and having a plurality of vertically spaced tangentially arranged outlets through which the aerated water is returned to the storage chamber, whereby a circular current is created and maintained in the storage water.

6. A bait tank according to claim 1 which includes means for cooling the water as it is aerated and before the water is returned to the storage chamber.

7. A bait tank according to claim 6 wherein said means for cooling the water as it is aerated comprises an evaporation unit mounted within the aerator in the path of the storage water delivered to the aerator from the storage chamber.

8. A bait tank according to claim 7 wherein the evaporation unit is removable.

9. A bait tank according to claim 8 wherein the evaporation unit comprises a wire mesh cylinder arranged in the aerator and in the path of the storage water delivered to the aerator, and a fan directing air through the wire mesh.

* * * * *